March 1, 1949. R. PATERAS PESCARA 2,463,418
FUEL INJECTION SYSTEM
Filed Jan. 19, 1943
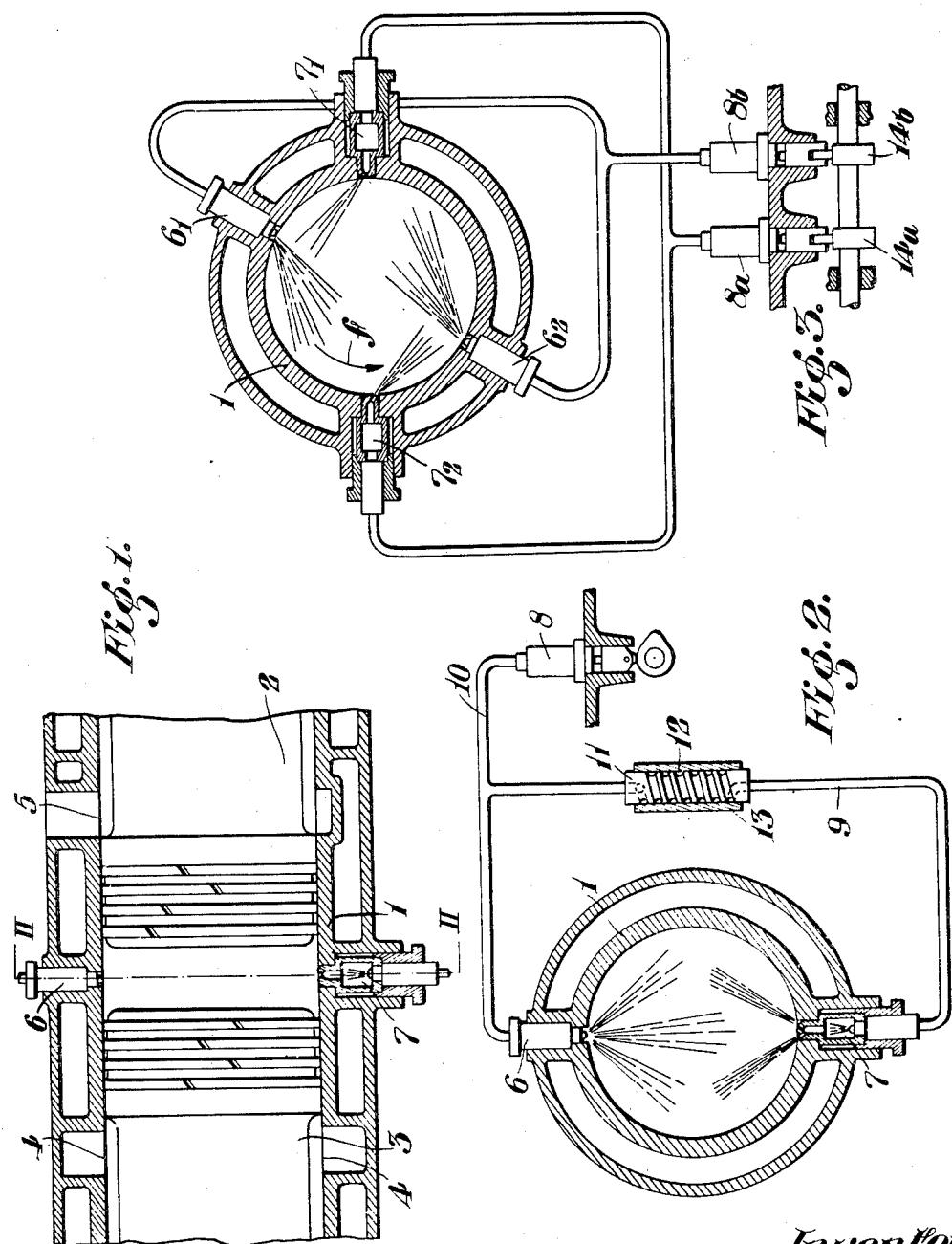
Inventor:
Raul Pateras Pescara,
by Dean Fairbank & Hirsch
Attorneys Patented Mar. 1, 1949

2,463,418

UNITED STATES PATENT OFFICE 2,463,418

FUEL INJECTION SYSTEM

Raul Pateras Pescara, Lisbon, Portugal

Application January 19, 1943, Serial No. 472,896
In France April 30, 1942

4 Claims. (Cl. 123—33)

My invention relates to fuel injection systems for internal combustion engines and it refers more particularly, but not exclusively, to such systems forming a part of a free-piston, variable-stroke engine.

My invention has for its object an improved fuel injection system which will permit a better operation of such engines with a higher efficiency.

According to my invention a fuel injection system for an internal-combustion engine, preferably a free-piston engine, comprises in combination for each engine cylinder at least one fuel injection nozzle of the direct injection type and at least one fuel injection nozzle of the pre-chamber type.

My invention also comprises other characteristic features which will be more fully explained in the following description with reference to the annexed drawings wherein:

Fig. 1 is an axial section of a cylinder in a free-piston engine of the opposed piston type, the said cylinder being supplied in fuel by a fuel injection system according to my invention.

Fig. 2 is a cross-section taken along line II—II of Fig. 1, the injection pump and associated parts being diagrammatically illustrated.

Fig. 3 is a cross-section of an engine cylinder, showing a modified construction.

In Figs. 1 and 2, the engine is a free-piston variable stroke internal combustion engine of the opposed piston type operating according to the two-stroke cycle. It may drive an air compressor or it may be a part of an auto-generator adapted to deliver exhaust gases under pressure to another machine such as a gas turbine.

The engine cylinder shown is provided with two pistons 2 and 3 adapted to work in opposed relation. When pistons 2a and 3 reach their outer dead points, they uncover intake ports 4 and exhaust ports 5. Ports 4 and the corresponding air conduits or pipes, not shown, are preferably so arranged and shaped that the air forced into the cylinder assumes a rotating or whirling motion about the cylinder axis which more or less lasts until fuel injection.

The reciprocating motions of pistons 2 and 3 are synchronized by any appropriate known synchronizing device not illustrated, since it forms no part of this invention.

In the engine cylinder illustrated, the combustion chamber is formed by the space comprised between pistons 2 and 3 when same are at their inner dead points (positions shown in Fig. 1).

Concerning fuel injection into the combustion chamber, it is a well-known fact that direct injection provides high engine efficiency but requires a strong air whirl or turbulence to ensure rapid combustion. Such a whirling motion is often difficult to obtain, more particularly in free piston engines with variable stroke, since stroke variations result in variations of the effective area of ports 4 and therefore in modifications of intake conditions. It is also known that fuel injection with fuel pre-chamber ensures rapid combustion but has the drawback that the area of contact between the hot gases and the cooled walls of the cylinder and associated parts is increased, which results in increased heat losses and therefore in lowered engine efficiency.

According to my invention, direct fuel injection and pre-chamber fuel injection are used in combination, whereby the advantages of both are combined while their respective disadvantages are practically avoided.

In the embodiment of Figs. 1 and 2 there are provided a direct fuel injection nozzle 6 and a pre-chamber fuel injection nozzle 7 in the same transverse plane of cylinder 1 and in diametrically opposed relation. The said nozzles may be fed by the same injection pump 8 as shown in Fig. 2, or by two separate pumps, as it will be more fully explained with reference to the arrangement illustrated in Fig. 3.

The arrangement is preferably such that injection by the direct injection nozzle begins before the injection by the pre-chamber nozzle, this latter injection resulting in a shortening of the final combustion period of the directly injected fuel. In the absence of the pre-chamber injection, this period would extend over a material time. This sort of phase displacement between the two nozzles is obtained (Fig. 2) by connecting the common injection pump 8 with the pre-chamber injection nozzle 7 by means of a conduit 9 of substantially greater length than the conduit 10 connecting pump 8 with the direct injection nozzle 6. This greater length is obtained by inserting in conduit 9 a device termed phase transformer, comprising a cylindrical core 11 provided with an helicoidal groove 12, and a tubular sleeve 13 tightly fitting on core 11. Groove 12 thus forms a part of conduit 9 for the fuel to be injected.

In the example of Fig. 3, the injection system comprises two direct injection nozzles $6_1$ and $6_2$ and two pre-chamber injection nozzles $7_1$ and $7_2$. The two nozzles of each group are diametrically opposed, as shown. The jets of the nozzles are so arranged that the fuel is injected in a direction substantially tangential with respect to the whirling movement of the air within cylinder 1, as indicated by arrow f.

The two groups of nozzles are fed by two separate pumps $8_a$ and $8_b$, the first one corresponding to the pre-chamber injection nozzles $7_1$ and $7_2$, while the second one corresponds to the direct injection nozzles $6_1$ and $6_2$. Pumps $8_a$ and $8_b$ are driven by cams $14_a$ and $14_b$, and the phase displacement between the two groups of nozzles is obtained by an appropriate timing and/or shaping of the cams.

When the injection system according to my invention is applied to an engine cylinder wherein the intake pressure is variable, it is of advantage to adjust the phase displacement between direct and pre-chamber injection according to the said pressure, in such a manner that the phase difference increases when the intake pressure increases. In accordance with this method, in a free-piston engine wherein the fuel injection as a whole is to be timed earlier when the pressure increases, the direct injection is more advanced at high pressures than the pre-chamber injection.

It will be noted that a variable intake pressure for an engine cylinder is found in the case of auto-generators adapted to generate hot gases under pressure. The said auto-generators comprise a power cylinder and a compressor cylinder supplying air under variable pressure to the power cylinder, while hot exhaust gases are supplied under pressure by the said power cylinder, such gases being formed of a mixture of combustion gases proper and of an excess of scavenging air. The pressure of this hot gaseous mixture varies in accordance with the intake pressure of the air fed into the power cylinder.

The quantity of fuel respectively injected by the injection nozzles is preferably so controlled that the quantity of directly injected fuel is larger than the quantity of fuel injected by the pre-chamber injection nozzles.

It is often of advantage to vary in accordance with the load the ratio between the quantity $Q_p$ of fuel injected by the pre-chamber injection nozzle or nozzles and the quantity $Q_d$ of directly injected fuel. This ratio may vary between the values $\frac{1}{3}$ (for no-load running or at light loads) and $\frac{1}{5}$ (at full load). This variation may be obtained by maintaining constant the quantity of fuel injected by the pre-chamber injection nozzles while the quantity of directly injected fuel is varied according to the load.

I claim:

1. The method of increasing the power of a Diesel type of free piston engine in which the fuel is injected into compressed air in the cylinder and is ignited by the heat of compression of said air, and in which there are provided at least one pre-chamber in communication with said cylinder, one direct fuel injection nozzle opening into said cylinder, and a pre-chamber fuel injection nozzle opening into said pre-chamber, said method consisting in beginning the injection of fuel at said direct injection nozzle before the beginning of fuel injection at said pre-chamber injection nozzle, and igniting said fuel in said cylinder before ignition in said pre-chamber.

2. The method as defined in claim 1, and in which a larger quantity of fuel is injected at the direct fuel injection nozzle than at the pre-chamber injection nozzle.

3. An internal combustion engine of the Diesel type with free floating pistons, and having for each power cylinder at least one direct fuel injection nozzle opening into said cylinder, at least one pre-chamber separately opening into said cylinder, at least one fuel injection nozzle adapted to inject liquid fuel into said pre-chamber; a fuel pump adapted to supply liquid fuel under pressure to said direct fuel injection nozzle and to said pre-chamber fuel injection nozzle in parallel and in unison with the operation of said cylinder; and fuel conduits connecting said fuel pump with said direct fuel injection nozzle and with said pre-chamber fuel injection nozzle; said fuel conduit leading to said pre-chamber fuel injection nozzle being of greater length than the conduit leading to said direct fuel injection nozzle, to produce phase lag in the timing of the fuel injection of said pre-chamber fuel injection nozzle with respect to said direct fuel injection nozzle to effect ignition in said power cylinder prior to ignition in said pre-chamber.

4. In an internal combustion engine of the Diesel type with a free floating piston in a power cylinder, a pair of direct fuel injection nozzles adapted to inject liquid fuel into said cylinder, said nozzles being disposed in substantially diametrically opposed relation with respect to the axis of said cylinder, a pair of pre-chambers communicating with said cylinder, a pair of fuel injection nozzles adapted to inject liquid fuel into said pre-chambers and thence into said cylinder, said last-named nozzles being disposed in substantially diametrically opposed relation with respect to the axis of said cylinder, and means to supply liquid fuel under pressure to said direct fuel injection nozzles and thereafter to said pre-chamber injection nozzles, said means being timed with the movement of the piston in the cylinder to effect ignition in the cylinder prior to ignition in the pre-chambers.

RAUL PATERAS PESCARA.

REFERENCES CITED

The following references are of record in the file of this patent:

UNITED STATES PATENTS

| Number | Name | Date |
| --- | --- | --- |
| 1,354,786 | Tartrais | Oct. 5, 1920 |
| 1,508,722 | Price | Sept. 16, 1924 |
| 1,607,173 | Salves | Nov. 16, 1926 |
| 1,684,074 | Schaeren | Sept. 11, 1928 |
| 1,919,488 | Thulin | July 25, 1933 |
| 1,998,708 | Campbell | Apr. 23, 1935 |
| 2,132,083 | Pescara | Oct. 4, 1938 |

FOREIGN PATENTS

| Number | Country | Date |
| --- | --- | --- |
| 130,742 | Great Britain | Aug. 5, 1919 |
| 23,461 | Sweden | Nov. 16, 1907 |
| 407,694 | Great Britain | Mar. 2, 1934 |
| 862,958 | France | Dec. 23, 1940 |